(12) United States Patent
Ward et al.

(10) Patent No.: US 12,182,803 B2
(45) Date of Patent: Dec. 31, 2024

(54) SECURE OPERATIONS IN AN AUTOMATIC TELLER MACHINE

(71) Applicant: Nautilus Hyosung America, Inc., Irving, TX (US)

(72) Inventors: William Edward Ward, Fort Worth, TX (US); Marc Alan Paust, Arlington, TX (US)

(73) Assignee: Nautilus Hyosung America, Inc., Irving, TX (US)

( * ) Notice: Subject to any disclaimer, the term of this patent is extended or adjusted under 35 U.S.C. 154(b) by 291 days.

(21) Appl. No.: 17/197,689

(22) Filed: Mar. 10, 2021

(65) Prior Publication Data

US 2022/0292500 A1     Sep. 15, 2022

(51) Int. Cl.
*G06Q 20/38* (2012.01)
*G06Q 20/10* (2012.01)
(Continued)

(52) U.S. Cl.
CPC ... *G06Q 20/38215* (2013.01); *G06Q 20/1085* (2013.01); *G06Q 20/40* (2013.01); *H04L 9/3265* (2013.01); *H04L 9/50* (2022.05)

(58) Field of Classification Search
CPC ......... G06Q 20/38215; G06Q 20/1085; G06Q 20/40; G06Q 20/385
See application file for complete search history.

(56) References Cited

U.S. PATENT DOCUMENTS 7,574,747 B2 * 8/2009 Oliveira ................. G06F 21/10
713/168
7,950,574 B1 * 5/2011 Ramachandran ....... G07F 19/20
235/375
8,523,055 B1 * 9/2013 Parsons ................. G07F 7/1008
235/379
(Continued)

FOREIGN PATENT DOCUMENTS

DE    19805279    *   8/1999 ............. G07F 19/20
DE    19805279 A1 *   8/1999 ............. G07F 19/20
(Continued)

OTHER PUBLICATIONS

Gravelle, Rob: The word of the Day Is "Nonce", Jan. 13, 2014, HTML Goodies, pp. 1-5 (Year: 2014).*
(Continued)

*Primary Examiner* — Bijendra K Shrestha
(74) *Attorney, Agent, or Firm* — Quinn IP Law (57) ABSTRACT

An automatic teller machine includes a controller and a cash dispenser unit. The controller is in electronic communication with dispense authorization parties. The controller is configured to generate a requested transaction in response to a manual entry of a requested cash value, and send a withdrawal request to a given dispense authorization party. The withdrawal request includes a unique nonce. The controller is configured to receive a withdrawal authorization from the given dispense authorization party. The withdrawal authorization includes a secure dispense token and a dispense nonce. The cash dispenser unit is configured to generate the unique nonce in response to the requested transaction, verify that the secure dispense token and the dispense nonce are valid, and dispense a currency matching the requested cash value in response to the secure dispense token and the dispense nonce being valid.

20 Claims, 8 Drawing Sheets

(51) Int. Cl.
*G06Q 20/40* (2012.01)
*H04L 9/32* (2006.01)
*H04L 9/00* (2022.01)

(56) References Cited

U.S. PATENT DOCUMENTS

| | | | | |
|---|---|---|---|---|
| 11,212,100 | B2* | 12/2021 | Sharpe | G06Q 50/40 |
| 2009/0132813 | A1* | 5/2009 | Schibuk | G06Q 20/4014 |
| | | | | 726/9 |
| 2012/0260088 | A1* | 10/2012 | Fries | H04L 63/168 |
| | | | | 713/155 |
| 2015/0248674 | A1* | 9/2015 | Han | G07F 7/00 |
| | | | | 705/43 |
| 2015/0332283 | A1* | 11/2015 | Witchey | G06F 21/00 |
| | | | | 705/3 |
| 2020/0036708 | A1* | 1/2020 | Mars | H04L 63/107 |
| 2020/0092272 | A1* | 3/2020 | Eisen | H04L 63/0869 |
| 2020/0322075 | A1* | 10/2020 | Bhandari | H04J 3/0688 |

FOREIGN PATENT DOCUMENTS

| | | | | |
|---|---|---|---|---|
| WO | WO-2006059139 A2 * | 6/2006 | | G16H 10/65 |
| WO | WO-2007120858 A2 * | 10/2007 | | B65H 16/00 |
| WO | WO 201811858 * | 6/2018 | | G06K 19/06 |

OTHER PUBLICATIONS

Danyal, Muhammad: How to Validate A JWT Token? Apr. 14, 2020, Medium, pagses 1-12 (Year: 2020).*

Sovrin: Sovrin: A Protocol and Token of Self-Sovereign Identity and Decentralized Trust, Jan. 2018, pp. 1-42. (Year: 2018).*

Dutta et al.: BBB Secure Nonce Based MAC Using Public Permutations, 2020, pp. 1-20 (Year: 2020).*

Danyal, M.: How to Validate a JWT Token, Apr. 14, 2020, Medium, pp. 1-12 (Year: 2020).*

Sovrin: A Protocol and Token of Self-Soverign Identity and Decentralized Trust, Jan. 2018, pp. 1-42 (Year: 2018).*

* cited by examiner

SECURE OPERATIONS IN AN AUTOMATIC TELLER MACHINE

INTRODUCTION

The present disclosure relates to a system and a method for secure operations in an automatic teller machine.

Automatic teller machines provide convenience to customers by allowing banking transactions 24 hours per day and 7 days per week. The automatic teller machines are connected with one or more entities that authenticate the transactions requested by the customers. Since the automatic teller machines contain currency, the machines are subject to attacks by thieves. The thieves try to convince the automatic teller machines, or an associated entity, to improperly dispense some or all of the money. An unauthorized dispense is financially harmful to the entities and the customers.

What is desired is a technique for a system and a method for secure operations of a cash dispenser unit within an automatic teller machine.

SUMMARY

An automatic teller machine is provided herein. The automatic teller machine includes a controller and a cash dispenser unit. The controller is in electronic communication with a plurality of dispense authorization parties that are remote from the automatic teller machine. The controller is configured to generate a requested transaction in response to a manual entry of a requested cash value, and send a withdrawal request to a given dispense authorization party of the plurality of dispense authorization parties. The withdrawal request includes a unique nonce. The controller is further configured to receive a withdrawal authorization from the given dispense authorization party. The withdrawal authorization includes a secure dispense token and a dispense nonce.

The cash dispenser unit is in electronic communication with the controller. The cash dispenser unit is configured to generate the unique nonce in response to the requested transaction, verify that the secure dispense token and the dispense nonce are valid, and dispense a currency matching the requested cash value in response to the secure dispense token and the dispense nonce being valid.

In one or more embodiments of the automatic teller machine, the cash dispenser unit is configured to reject the withdrawal authorization in response to finding invalid one or more of the secure dispense token and the dispense nonce.

In one or more embodiments of the automatic teller machine, the cash dispenser unit verifies that the secure dispense token and the dispense nonce are valid by verifying that the secure dispense token comes from an issuer on a list of trusted token issuers.

In one or more embodiments of the automatic teller machine, the cash dispenser unit verifies that the secure dispense token and the dispense nonce are valid by verifying that the dispense nonce has been received a single time based on a list of historic nonce values that were previously utilized.

In one or more embodiments of the automatic teller machine, the cash dispenser unit verifies that the secure dispense token and the dispense nonce are valid by verifying that a dispense timestamp of the secure dispense token is correct relative to a request timestamp of a request token.

In one or more embodiments of the automatic teller machine, the cash dispenser unit verifies that the secure dispense token and the dispense nonce are valid by verifying a chain of trust for a signing certificate of the secure dispense token is valid.

In one or more embodiments of the automatic teller machine, the cash dispenser unit verifies that the secure dispense token and the dispense nonce are valid by verifying that the dispense nonce matches the unique nonce.

In one or more embodiments of the automatic teller machine, the cash dispenser unit verifies that the secure dispense token and the dispense nonce are valid by verifying a digital signature of the secure dispense token is valid and properly created by information of the given dispense authorization party.

In one or more embodiments, the automatic teller machine includes an electronics compartment that houses the controller, a secure compartment that houses the cash dispenser unit and is physically inaccessible from the electronics compartment, and a door attached to the secure compartment and configured to provide lockable access to the cash dispenser unit.

A method for secure operations in an automatic teller machine is provided herein. The method includes generating, in a controller, a requested transaction in response to a manual entry of a requested cash value; generating, in a cash dispenser unit, a unique nonce in response to the requested transaction; and sending a withdrawal request from the controller to a given dispense authorization party of a plurality of dispense authorization parties. The withdrawal request includes the unique nonce. The plurality of dispense authorization parties is remote from the automatic teller machine. The method includes receiving, at the controller from the given dispense authorization party, a withdrawal authorization. The withdrawal authorization includes a secure dispense token and a dispense nonce.

The method includes verifying, in the cash dispenser unit, that the secure dispense token and the dispense nonce are valid; and dispensing, from the cash dispenser unit, a currency that matches the requested cash value in response to the secure dispense token and the dispense nonce being valid.

In one or more embodiments of the method, the verifying that the secure dispense token and the dispense nonce are valid includes verifying that the secure dispense token comes from an issuer on a list of trusted token issuers.

In one or more embodiments of the method, the verifying that the secure dispense token and the dispense nonce are valid includes verifying that the dispense nonce has been received a single time based on a list of historic nonce values that were previously verified.

In one or more embodiments of the method, the verifying that the secure dispense token and the dispense nonce are valid includes verifying that a dispense timestamp of the secure dispense token is correct relative to a request timestamp of a request token.

In one or more embodiments of the method, the verifying that the secure dispense token and the dispense nonce are valid includes verifying a chain of trust for a signing certificate of the secure dispense token is valid.

In one or more embodiments of the method, the verifying that the secure dispense token and the dispense nonce are valid includes verifying that the dispense nonce matches the unique nonce.

In one or more embodiments of the method, the verifying that the secure dispense token and the dispense nonce are valid includes verifying a digital signature of the secure dispense token is valid and properly created by information of the given dispense authorization party.

A method for secure operations in an automatic teller machine is provided herein. The method includes receiving, at a cash dispenser unit through a controller from a given dispense authorization party of a plurality of dispense authorization parties, an activate token while the cash dispenser unit is in an enrollment state. The plurality of dispense authorization parties is remote from the automatic teller machine. The method includes allocating, in the cash dispensing unit, a given trust of a plurality of trusts to the given dispense authorization party in response to the activate token while the cash dispenser unit is in the enrollment state. The given trust binds the given dispense authorization party to the cash dispenser unit.

The method further includes receiving, at the cash dispenser unit through the controller from the given dispense authorization party, a withdrawal authorization while the cash dispenser unit is in an active state. The withdrawal authorization includes a secure dispense token, a dispense nonce, and an authorized cash value. The method includes verifying, in the cash dispenser unit, that the secure dispense token and the dispense nonce are valid based on the given trust; and dispensing, from the cash dispenser unit, a currency that matches the authorized cash value in response to the secure dispense token and the dispense nonce being valid while the cash dispenser unit is in the active state.

In one or more embodiments, the method includes receiving, at the cash dispenser unit through the controller, an enrollment command to transition from an inactive state to the enrollment state. The cash dispenser unit is configured to accept the activate token while in the enrollment state and reject the activate token while in the inactive state.

In one or more embodiments, the method includes receiving, at the cash dispenser unit through the controller from the given dispense authorization party, a deactivation token while the cash dispenser unit is in the active state; and unbinding the given dispense authorization party from the cash dispenser unit in response to the deactivation token.

In one or more embodiments of the method, the cash dispenser unit enters a transition state in response to the receiving of the deactivation token, and the cash dispenser unit is configured to reject another withdrawal authorization from the given dispense authorization party while in the transition state.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure generally provide a protocol for a methodology and/or a framework that creates a layer of trust between a party and a cash dispenser unit. The party may have a financial and/or reputational risk of a financial transaction. The party may be a bank, a network, a software vendor, or the like. The cash dispenser unit may have responsibility for the dispersal of funds from an automatic teller machine. Failure to validate an authenticity of a message to the cash dispenser unit is recognized as a protocol failure. The protocol failure causes the cash dispenser unit to refuse the operation requested by the message. The protocol ensures the cash-dispensing operations of the cash dispenser unit are robust against line attacks, replay attacks, malicious software injection, hard drive swaps, and/or other types of attempts to circumvent a standard transaction flow.

The cash dispenser unit is generally enclosed in a secure compartment in the automatic teller machines. The cash dispenser unit is in electronic communication with a controller mounted in an electronics compartment of the automatic teller machine. Even if an attacker were to gain access to the controller and force a dispense command, the protocol provides several checks within the cash dispenser unit that would detect and reject improper dispense commands.

Figure 1:
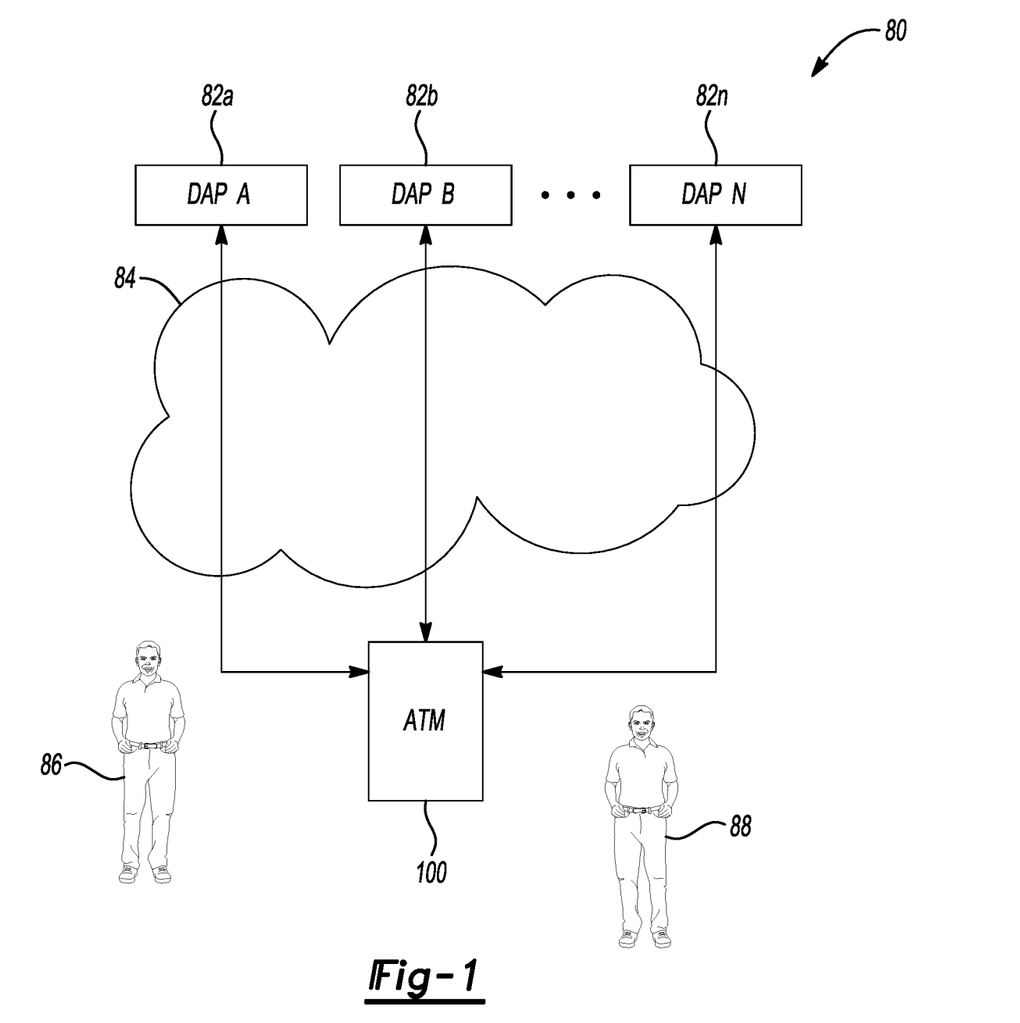
FIG. 1 is a schematic diagram illustrating a context of a system in accordance with one or more exemplary embodiments.

Referring to FIG. 1, a schematic diagram illustrating a context of a system 80 is shown in accordance with one or more exemplary embodiments. The system 80 generally includes multiple dispense authorization parties (DAP) 82a-82n, a communication network 84, a technician 86, multiple customers (one shown) 88, and one or more automatic teller machines (one shown) 100. The system 80 implements the protocol of the present disclosure to minimize unauthorized dispensing of currency from the automatic teller machine 100.

Each dispense authorization party 82a-82n is a bank, a network, a financial institution, or a software vendor. The dispense authorization parties 82a-82n are parties to one or more financial transactions that may authorize dispense operations from the automatic teller machine 100. The dispense authorization parties 82a-82n may be remotely located from the automatic teller machine 100. In some situations, a dispense authorization party 82a-82n may be inside a particular building while the automatic teller machine 100 is located elsewhere inside or outside the particular building. In other situations, the automatic teller machine 100 may be miles to hundreds of miles or more away from a nearest dispense authorization party 82a-82n. The dispense authorization parties 82a-82n are in electronic communication with the automatic teller machine 100 through the communication network 84.

The communication network 84 implements one or more networks. The communication network 84 is operational to provide bidirectional communications between the automatic teller machine 100 and the dispense authorization parties 82a-82n. The communication network 84 may include, but is not limited to, the Internet, wide area networks, local area networks, wired networks, wireless networks, optical network, and radio-frequency networks.

Other types of networks may be implemented to meet the design criteria of a particular application.

The technician 86 is a person authorized to perform service on the automatic teller machine 100. The technician 86 generally has access to an interior of the automatic teller machine 100 to perform repairs, perform maintenance operations, perform setup operations, remove envelopes deposited into the machine, and/or add currency to the machine.

The customer 88 is a person authorized to utilize the automatic teller machine 100. The customer 88 generally has an account with one or more of the dispense authorization parties 82$a$-82$n$. The customer 88 may perform a variety of banking operations using the automatic teller machine 100. The banking operations generally include, but are not limited to, withdrawal of cash, depositing checks, depositing cash, transferring funds between accounts, and checking account balances.

The automatic teller machine 100 implements an automated banking device that enables the customer 88 to access personal and/or business accounts at any time of any day. For a cash withdrawal transaction, the automatic teller machine 100 communicates with a corresponding one of the dispense authorization parties 82$a$-82$n$ to verify that the customer 88 has sufficient funds in a targeted account to cover a withdrawal request. If the corresponding dispense authorization party 82$a$-82$n$ approves the withdrawal, the automatic teller machine 100 dispenses (or gives) the requested amount to the customer 88.

Figure 2:
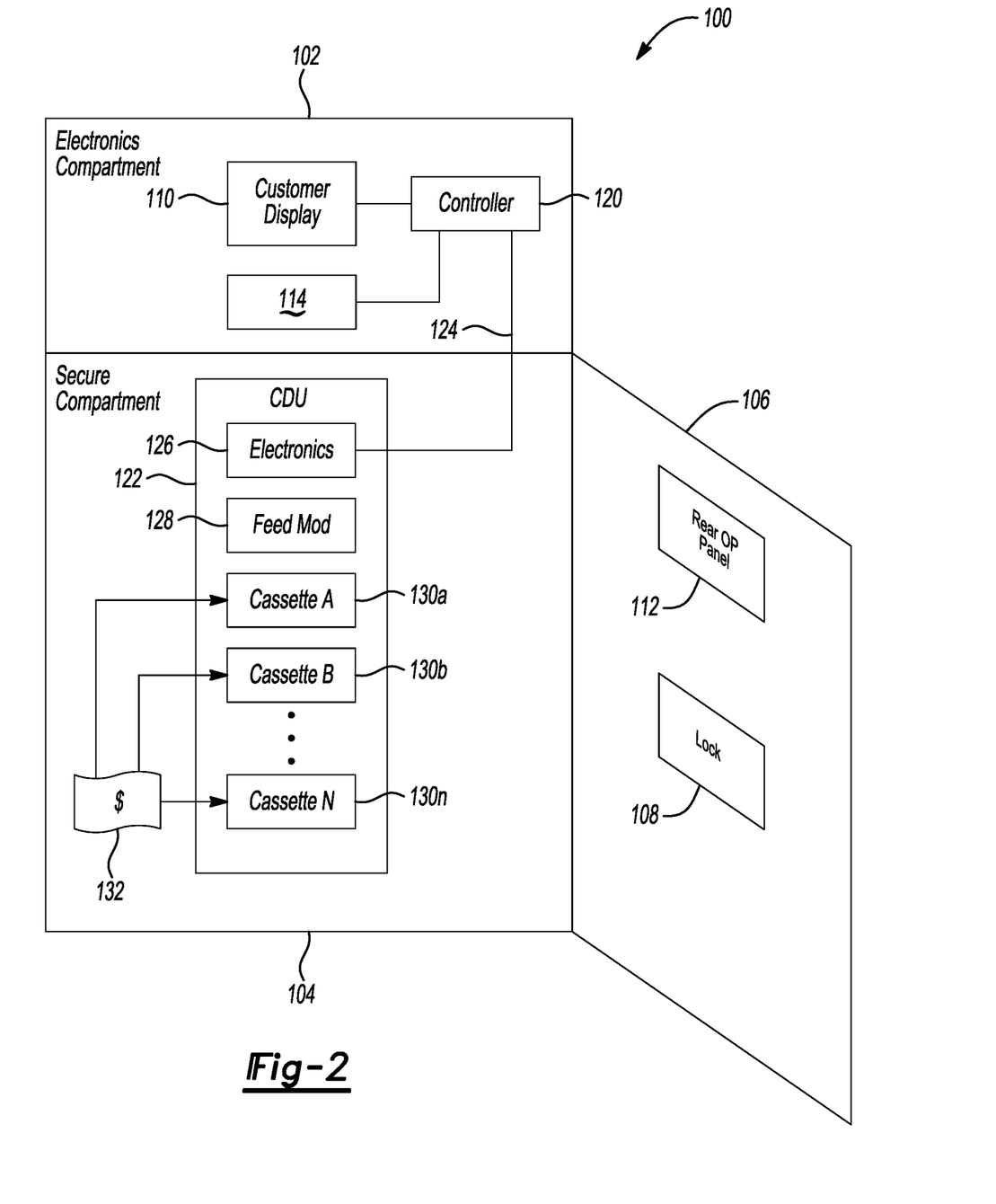
FIG. 2 is a perspective diagram of an automatic teller machine in accordance with an exemplary embodiment.

Referring to FIG. 2, a perspective diagram of an example implementation of the automatic teller machine 100 is shown in accordance with an exemplary embodiment. The automatic teller machine 100 generally includes an electronics compartment 102 and a secure compartment 104. A door 106 with a lock 108 prevent access to the secure compartment 104 from unauthorized people. The technician 86 is capable of opening the lock 108 on the door 106 to access an interior of the secure compartment 104.

The electronics compartment 102 houses a controller 120, a customer display 110, a rear operator panel 112, and a card reader 114. Other devices may be housed in the electronics compartment 102. The controller 120 is configured to control the overall operations of the automatic teller machine 100. The controller 120 is in bidirectional communication with the dispense authorization parties 82$a$-82$n$ via the communication network 84. The controller 120 is also in bidirectional communication with the electronics circuit 126 via a local communication bus 124.

The secure compartment 104 houses a cash dispenser unit 122 and a local communication bus 124. Other devices may be housed in the secure compartment 104. The cash dispenser unit 122 includes an electronics circuit 126, a feed module 128, and multiple cash cassettes 130$a$-130$n$. The cash cassettes 130$a$-130$n$ are configured to hold currency 132.

The customer display 110 enables the customer 88 to enter banking transaction requests and provides visual and/or audio information to the customer 88. The rear operator panel 112 enables the technician 86 to perform maintenance and setup operations on the automatic teller machine 100 without accessing the electronics compartment 102 or the secure compartment 104. The card reader 114 is operational to read an electronic/magnetic banking card that partially verifies an identity of the customer 88.

The controller 120 implements one or more computers. The controller 120 is operational to communicate with the dispense authorization parties 82$a$-82$n$ via the communication network 84 and the cash dispenser unit 122 via the local communication bus 124. The controller 120 is configured to interact with the customer 88 via the customer display 110 and the card reader 114. The controller 120 also interacts with the technician 86 via the rear operator panel 112 and a variety of interfaces on a side of the controller 120. The controller 120 provides a level of defense against attacks on the system 80 by performing some validity checks before a cash dispense operation is sent to the cash dispenser unit 122.

The cash dispenser unit 122 implements a hardware-based device capable of executing financial transactions and conforms to the protocol defined in the present disclosure. The cash dispenser unit 122 is operational to store and dispense the currency 132 in response to commands received from the controller 120 via the local communication bus 124. The cash dispenser unit 122 is also operational to receive and store envelopes, cash, and checks deposited by the customer 88 into the automatic teller machine 100. Generally, the cash dispenser unit 122 may be any device capable of creating financial harm for the dispense authorization parties 82$a$-82$n$ when used improperly or under malfunctioning conditions.

The local communication bus 124 implements a bidirectional electrical bus. The local communication bus 124 is operational to provide bidirectional command and data transfers between the controller 120 and the cash dispenser unit 122. In various embodiments, the local communication bus 124 may be a Universal Serial Bus, an RS-422 bus, or an Ethernet bus. Other types of buses may be implemented to meet the design criteria of a particular application.

The electronics circuit 126 implements local control of operations inside the cash dispenser unit 122. The electronics circuit 126 communicates bidirectionally with the controller 120 via the local communication bus 124. The electronics circuit 126 is operational to respond to commands from the controller 120 by validating the commands and subsequently acting on valid commands and rejecting invalid commands. The electronics circuit 126 provides a level of defense against attacks by participating in the protocol of the present disclosure.

The feed module 128 is operational to dispense the currency 132 stored in the cash cassettes 130$a$-130$n$ to the customer 88. The feed module 128 may also be operational to receive envelopes, cash and checks from the customer 88 for storage inside the secure compartment 104.

The cash cassettes 130$a$-130$n$ are operational to store the currency 132 loaded into the automatic teller machine 100. Under control of the electronics circuit 126, the cash cassettes 130$a$-130$n$ may transfer the currency 132 to the feed module 128 for presentation to the customer 88.

During a dispense operation, the controller 120 generates a withdrawal request in response to a manual entry of a requested cash value entered by the customer 88 at the customer display 110. In response to the withdrawal request, the electronics circuit 126 in the cash dispenser unit 122 generates a unique nonce specifically for the manual entry. The controller 120 passes the withdrawal request and the unique nonce to a corresponding one of the dispense authorization parties 82$a$-82$n$.

If the withdrawal request is approved by the corresponding dispense authorization party 82$a$-82$n$, the controller 120 receives back a withdrawal authorization and a secure dispense token with a dispense nonce. The controller 120 verifies that the withdrawal authorization is valid. If so, the controller 120 passes the secure dispense token and the dispense nonce to the electronics circuit 126 in the cash dispenser unit 122. The electronics circuit 126 subsequently verifies that the secure dispense token is valid and the dispense nonce is valid. If both the secure dispense token and the dispense nonce are valid, the cash dispenser unit 122 presents currency 132 in an amount matching the requested withdrawal to the customer 88. If any of the validation steps fail in the corresponding dispense authorization party 82a-82n, the controller 120, or the cash dispenser unit 122, an error is generated, the withdrawal transaction is halted, and the automatic teller machine 100 does not dispense the requested currency 132.

The request tokens and the secure dispense tokens generally store data suitable to generate a digital signature, nonce values, optional passwords, certificates, transaction types, and transaction amounts. The request tokens may include an account number, a unique nonce useable for a single transaction, a transaction type, and a transaction amount. The secure dispense tokens provide for the authenticity of the transaction, authorize the operation, include a dispense nonce, and contain other metadata about the transaction.

The unique nonces and the dispense nonces may be arbitrary numbers that are generally used just once in a banking transaction. In various embodiments, the unique nonces are generated by the electronics circuit 126 within the cash dispenser unit 122. Once used, a nonce value is stored in a list of historical nonce values such that the same nonce value is not used a second time.

For transactional security, trust may be generated by trusted authorities or through cryptography. In the system 80, the trust may be based on the authenticated automatic teller machine 100, and the dispense authorization parties 82a-82n. Therefore, no transaction should occur unless the parties are known by corresponding authentication frameworks. Interactions among the parties may utilize a single, or a few trusted certificate authorities.

Figure 3:
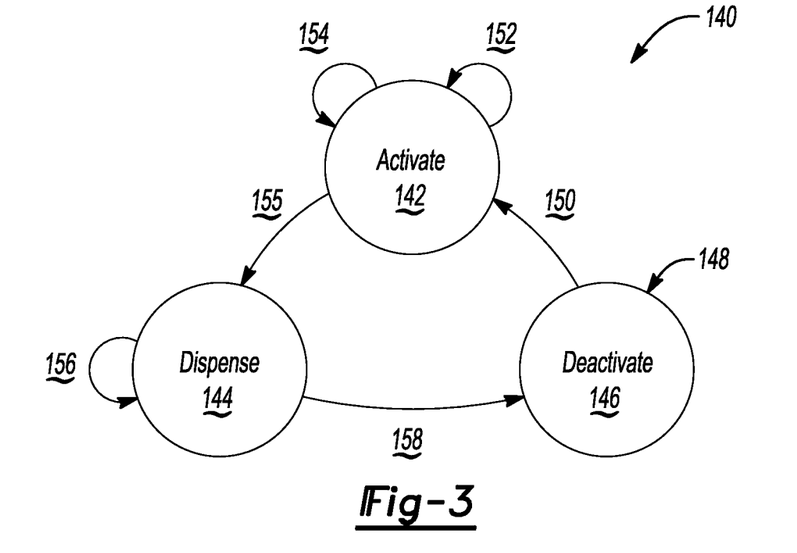
FIG. 3 is a phase transition diagram in accordance with one or more exemplary embodiments.

Referring to FIG. 3, an example implementation of a phase transition diagram 140 is shown in accordance with one or more exemplary embodiments. The phase transition diagram 140 generally describes multiple operations used by the automatic teller machine 100 during normal operations. The phase transition diagram 140 includes an activate phase 142, a dispense phase 144, and a deactivate phase 146. The protocol defines three operations that contribute to the overall dispense procedure: a registration operation, a dispense operation, and an un-registration operation. Each operation utilizes trust to be verified between the cash dispenser unit 122 and one or more dispense authorization parties 82a-82n (see FIG. 1).

The transition diagram 140 may start with an initialization transition 148 into the deactivate phase 146. In response to an enrollment command 150, the cash dispenser unit 122 may transition into the activate phase 142.

In the activate phase 142, one or more dispense authorization parties 82a-82n transmits an activate token 152 of appropriate class. Each activate token 152 contains sufficient information to bind the cash dispenser unit 122 to the issuing dispense authorization party 82a-82n. The activate tokens 152 contain issuer values that are stored by the cash dispenser unit 122 to verify future operations.

For each valid activate token 152 received, the cash dispenser unit 122 allocates trust 154 to the issuing dispense authorization party 82a-82n. An unlimited number of dispense authorization parties 82a-82n may be trusted by the cash dispenser unit 122 at a given time. An enrollment command 150 may not be recognized again without failure until after a deactivate operation is successfully performed.

Upon receipt of an end enrollment command 155, the cash dispenser unit 122 may transition from the activate phase 142 to the dispense phase 144. While in the dispense phase 144, the number of trusted dispense authorization parties 82a-82n is held constant. In the dispense phase 144, a dispense operation authorizes the cash dispenser unit 122 to dispense a defined amount of currency 132. Once the transaction is authorized by the appropriate dispense authorization party 82a-82n, the dispense authorization party 82a-82n creates a secure dispense token 156 with the parameters of the transaction. The secure dispense token 156 is transmitted to the controller 120 and relayed to the cash dispenser unit 122 for verification. If verification of the secure dispense token 156 fails, the cash dispenser unit 122 does not dispense the requested currency 132.

A deactivation token 158 is used to remove the binding between a particular dispense authorization party 82a-82n and the cash dispenser unit 122. The deactivation token 158 causes a transition from the dispense phase 144 to the deactivate phase 146. The deactivate operation may be performed if the cash dispenser unit 122 is to be removed from service on the particular dispense authorization party 82a-82n, or if one or more of the dispense authorization parties 82a-82n initiates a certificate rotation operation. The cash dispenser unit 122 does not dispense after a trusted dispense authorization party 82a-82n has performed a deactivation operation.

In various embodiments, the tokens 152, 156, and 158 may be JavaScript Object Notation (JSON) web signature encoded using the JSON Web Signature Compact Serialization. A JavaScript Object Signing and Encryption (JOSE) header generally includes a head parameter that indicates the type of digital signature technique used to protect the payload and header. The technique usage may be defined in RFC7518. A list of acceptable values for an "alg" (algorithm) type of header may be: RS256; RS512; PS256; PS512; ES256; ES384; and ES512.

A type ("typ") header parameter declares a token class. A list of type header parameters and corresponding token classes is provided in Table 1 as follows:

TABLE 1

| Type Parameter | Token Class |
| --- | --- |
| act | Activate Token |
| disp | Secure Dispense Token |
| dact | Deactivate Token |

An "x5c" (X.509 certification chain) header parameter is generally as defined by RFC7515. The "x5c" contains a signing certificate and one or more intermediate certificate authority certificates. The root certificate authority certificate is generally not included in the "x5c" header parameter. An "x5t #5256" (X. 509 Certificate SHA-256 Thumbprint) header parameter is as defined by RFC7515.

The tokens 152, 156, and 158 contain JSON Web Token (JWT) payload objects represented as JSON Objects. Common attributes of the token classes are provided in Table 2 as follows:

TABLE 2

| Attribute | Data Type | Description | Example Value |
|---|---|---|---|
| uid | String | A unique identifier for the terminal receiving the token, usually a terminal identification | T18846 |
| exp | Number | An expiration date/time of the secure dispense token represented as a Unix timestamp. | 1604693240 |
| iat | Number | An issuance date of the secure dispense token represented as a Unix timestamp. | 1604693240 |
| nbf | Number | A time at which the secure dispense token becomes value represented as a Unix timestamp. | 1604693240 |
| nonce | String | A Base64URL-encoded number that was provided by the cash dispenser unit. | YXNkZmFzc2Y |

The activate (or registration) tokens 152 are JSON Objects that contain information intended to register, or bind, the cash dispenser unit 122 to a dispense authorization party 82a-82n. The JSON Web Token payloads of the activate tokens 152 are JSON objects with data as defined in Table 3 as follows:

TABLE 3

| Attribute | Data Type | Description | Example Value |
|---|---|---|---|
| iss | String | The name of the issuer of the secure dispense tokens. This may match the common name (CN) of the signing certificate. | Happy State Bank |

An example activate token 152 may contain the following data. Header data is provided in Table 4 as follows:

TABLE 4

| Attribute | Example Value |
|---|---|
| typ | act |
| alg | RS256 |
| x5c | ["MIIEljC...cy4NOf08=", "MIIFcz...L5Gp++w=="] |
| x5t#S256 | e76d...3__76f |

Payload data is provided in Table 5 as follows:

TABLE 5

| Attribute | Example Value |
|---|---|
| uid | T123456 |
| exp | 1604242800 |
| iat | 1604242500 |
| nbf | 1604242200 |
| nonce | YXNkZmFzc2Y |
| iss | My Bank Name |

The secure dispense tokens 156 are JSON Objects that contain sufficient information for the cash dispenser unit 122 to verify dispense authorizations by the dispense authorization parties (DAP) 82a-82n. The JSON Web Signature (JWS) payloads of the secure dispense tokens 156 are JSON objects with data as defined in Table 6 as follows:

TABLE 6

| Attribute | Data Type | Description | Example Value |
|---|---|---|---|
| amt | Number | The dispense amount as authorized by the financial transaction. | $200.00 |
| txnid | String | A unique transaction identification created by the dispenser authorization parties | 472594az021 |

An example secure dispense token 156 may contain the following data. Header data is provided in Table 7 as follows:

TABLE 7

| Attribute | Example Value |
|---|---|
| typ | disp |
| alg | RS256 |
| x5c | ["MIIEljC...cy4NOf08=", "MIIFcz...L5Gp++w=="] |
| x5t#S256 | e76d...3__76f |

Payload data is provided in Table 8 as follows:

TABLE 8

| Attribute | Example Value |
|---|---|
| uid | T123456 |
| exp | 1604242800 |
| iat | 1604242500 |
| nbf | 1604242200 |
| nonce | YXNkZmFzc2Y |
| amt | 200.00 |
| txnid | 0043 |

The deactivate token 158 is a JSON Object that contains information authorizing the cash dispenser unit 122 to remove the binding from the currently activated dispenser authorization party 82a-82n. The JSON Web Signature payload of the deactivation token 158 is a JSON object with data as defined in Table 9 as follows:

TABLE 9

| Attribute | Data Type | Description | Example Value |
|---|---|---|---|
| iss | String | The name of the issuer of the deactivation token. This will match the common name of the signing certificate. | Happy State Bank |

An example deactivate token 158 may contain the following data. Header data is provided in Table 10 as follows:

TABLE 10

| Attribute | Example Value |
|---|---|
| typ | dact |
| alg | RS256 |
| x5c | ["MIIEljC...cy4NOf08=", "MIIFcz...L5Gp++w=="] |
| x5t#S256 | e76d...3__76f |

Payload data is provided in Table 11 as follows:

TABLE 11

| Attribute | Example Value |
|---|---|
| uid | T123456 |
| exp | 1604242800 |
| iat | 1604242500 |
| nbf | 1604242200 |
| nonce | YXNkZmFzc2Y |
| iss | My Bank Name |

The tokens 152, 156, and 158 may contain multiple data items. For example, a token may include transaction data, a timestamp, and a nonce. The digital signature is generated over the entire message (e.g., the entire token), and includes the nonce, the transaction amount, timestamps, etc. The digital signature is created by the dispense authorization party 82a-82n using private (or secret) information, usually a private component of an RSA (Rivest-Shamir-Adleman) key pair. The key pair is trusted by the cash dispenser unit 122 by validating a chain of trust using a pinned root certificate authorities. In various situations, the nonce may be transported alone (except for the protocol-specific transaction request data) to the dispense authorization party 82a-82n, and then the nonce is transported within the token from the dispense authorization party 82a-82n to the controller 120 and subsequently the cash dispenser unit 122.

Figure 4:
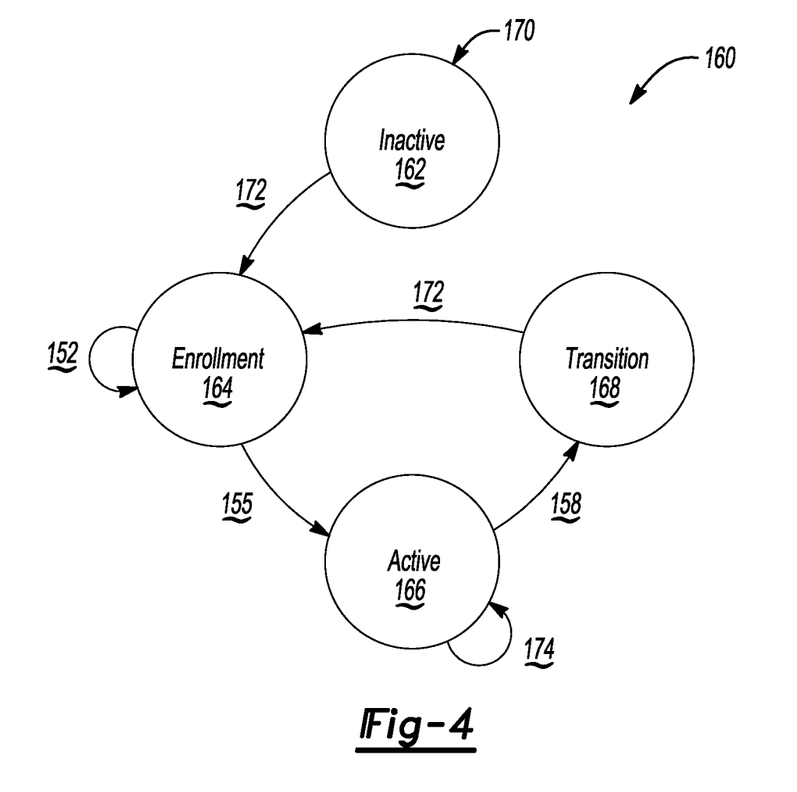
FIG. 4 is a state transition diagram in accordance with one or more exemplary embodiments.

Referring to FIG. 4, an example implementation of a state transition diagram 160 is shown in accordance with one or more exemplary embodiments. The state transition diagram 160 generally describes the states of the cash dispenser unit 122. The state transition diagram 160 generally includes an inactive state 162, an enrollment state 164, an active state 166, and a transition state 168.

The cash dispenser unit 122 implements a state machine. Token classes that may be processed during each state are illustrated in Table 12 as follows:

TABLE 12

| State | Activate | Dispense | Deactivate |
|---|---|---|---|
| Inactive | | | |
| Enrollment | X | | |
| Active | | X | X |
| Transition | X | | |

The cash dispenser unit 122 may begin with an initialization 170 in the inactive state 162. While in the inactive state 162, the cash dispenser unit 122 does not enforce the protocol, and the cash dispenser unit 122 is not bound to the dispense authorization parties 82a-82n.

Upon receipt of an enrollment command 172, the cash dispenser unit 122 transitions from the inactive state 162 to the enrollment state 164. While in the enrollment state 164, the cash dispenser unit 122 may accept activate tokens 152 from one or more of the dispense authorization parties 82a-82n and/or the technician 86 through the controller 120 and/or directly from the technician 86 without involving the controller 120. The activate tokens 152 cause the cash dispenser unit 122 to bind with the corresponding dispense authorization party 82a-82n that issued to the active tokens 152. The cash dispenser unit 122 will enforce the protocol beginning in the enrollment state 164.

Upon receipt of an end enrollment command 155, the cash dispenser unit 122 transitions from the enrollment state 164 to the active state 166. The cash dispenser unit 122 is now bound to one or more of the issuing dispense authorization parties 82a-82n (see FIG. 1). In the active state 166, the cash dispenser unit 122 limits the dispensing of the currency 132 in response to the receipts of valid secure dispense tokens from bound dispense authorization parties 82a-82n. When a valid withdrawal authorization 174 is received, the cash dispenser unit 122 may verify the withdrawal authorization 174 and, if valid, dispense the requested currency 132. The cash dispenser unit 122 ignores any secure dispense tokens from other, unbound dispense authorization parties 82a-82n until a bound dispense authorization party 82a-82n performs a deactivation operation.

A deactivate token 158 from a bound dispense authorization party 82a-82n and/or the technician 86 may be received and accepted by the cash dispenser unit 122 while in the active state 166. If the deactivate token 158 is valid, the cash dispenser unit 122 transitions from the active state 166 to the transition state 168 and is no longer bound to the issuing dispense authorization party 82a-82n. While in the transition state 168, the cash dispenser unit 122 rejects any new withdrawal authorizations 174 until a new dispense authorization party 82a-82n is registered in place of the previous dispense authorization party 82a-82n. The number of trusted dispense authorization parties 82a-82n may match the number of trusted dispense authorization parties 82a-82n enrolled during the enrollment state 164. The cash dispenser unit 122 remains in the transition state 168 until a new enrollment command 172 is received. In response to the new enrollment command 172, the cash dispenser unit 122 transitions to the enrollment state 164 and waits for a subsequent activate token 152.

Figure 5:
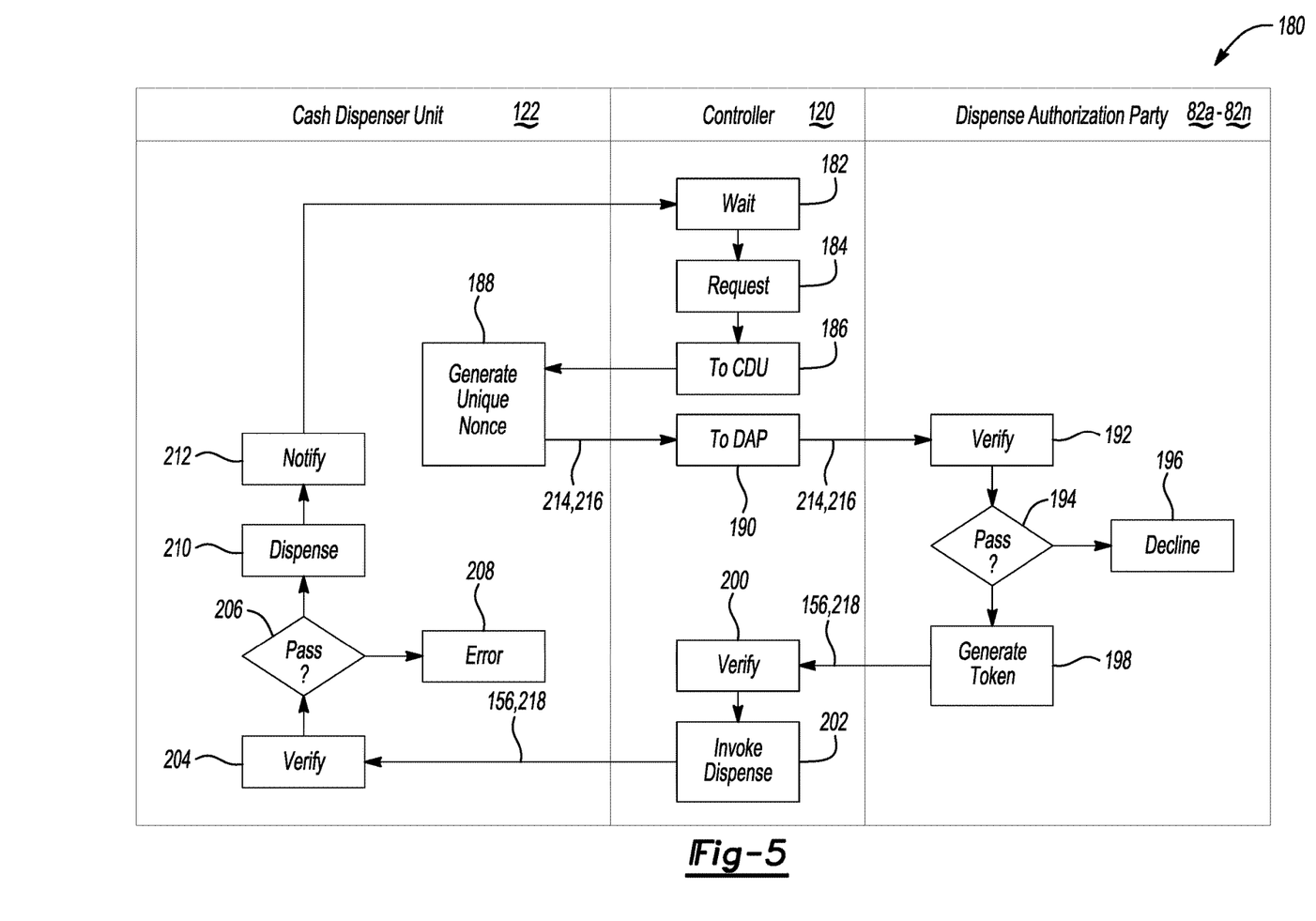
FIG. 5 is a flow diagram of a method of operation of the system in accordance with one or more exemplary embodiments.

Referring to FIG. 5, a flow diagram of an example implementation of a method of operation 180 of the system 80 is shown in accordance with one or more exemplary embodiments. The method (or process) 180 may be implemented by the automatic teller machine 100 and the dispense authorization parties 82a-82n. The method 180 generally includes a step 182, a step 184, a step 186, a step 188, a step 190, a step 192, a step 194, a step 196, a step 198, a step 200, a step 202, a step 204, a step 206, a step 208, a step 210, and a step 212. The sequence of steps is shown as a representative example. Other step orders may be implemented to meet the criteria of a particular application.

While in the active state 166 (FIG. 4), the controller 120 may wait in the step 182 to receive a manual request 184 from the customer 88. When manual request 184 for a withdrawal is received, the controller 120 sends the withdrawal request to the cash dispenser unit (CDU) 122 in the step 186.

The cash dispenser unit 122 responds to the withdrawal request in the step 188 by generating a request token 214 and a unique nonce 216. The request token 214 and the unique nonce 216 are transferred in a withdrawal request through the controller 120 to a corresponding one of the dispense authorization parties (DAP) 82a-82n (see FIG. 1) in the step 190.

The dispense authorization party 82a-82n that receives the withdrawal request verifies the transaction in the step 192. If the withdrawal request is rejected at the step 194 (e.g., the account being accessed is closed), the dispense authorization party 82a-82n may decline the withdrawal request and send a declined notice to the controller 120 in the step 196. If the withdrawal request is approved at the step 194, the dispense authorization party 82a-82n generates a secure dispense token 156 in the step 198 and transfers the secure dispense token 156 and a dispense nonce 218 to the controller 120.

In the step 200, the controller 120 verifies the secure dispense token 156 to see if the transaction has been authorized. For example, the controller 120 may compare the requested withdrawal amount with the authorized amount. If the two values match, the controller 120 may conclude that the transaction response is valid. In the step 202, the controller 120 may invoke a dispense operation to the cash dispenser unit 122 and pass the secure dispense token 156 and the dispense nonce 218 to the cash dispenser unit 122.

The cash dispenser unit 122 may check the secure dispense token 156 and dispense nonce 218 in the step 204. If the cash dispenser unit 122 finds an error in one or both of the secure dispense token 156 and/or the dispense nonce 218, the cash dispenser unit 122 may send an error report to controller 120 in the step 208. If the cash dispenser unit 122 finds both the secure dispense token 156 and the dispense nonce 218 are valid (e.g., the dispense nonce 218 matches the unique nonce 216 generated in the step 188), the cash dispenser unit 122 dispenses the requested currency 132 in the step 210. Thereafter, the cash dispenser unit 122 notifies the controller 120 in the step 212 that the transaction has been completed. The method 180 subsequently returns to the step 182 and wait for another requested transaction.

Figure 6:
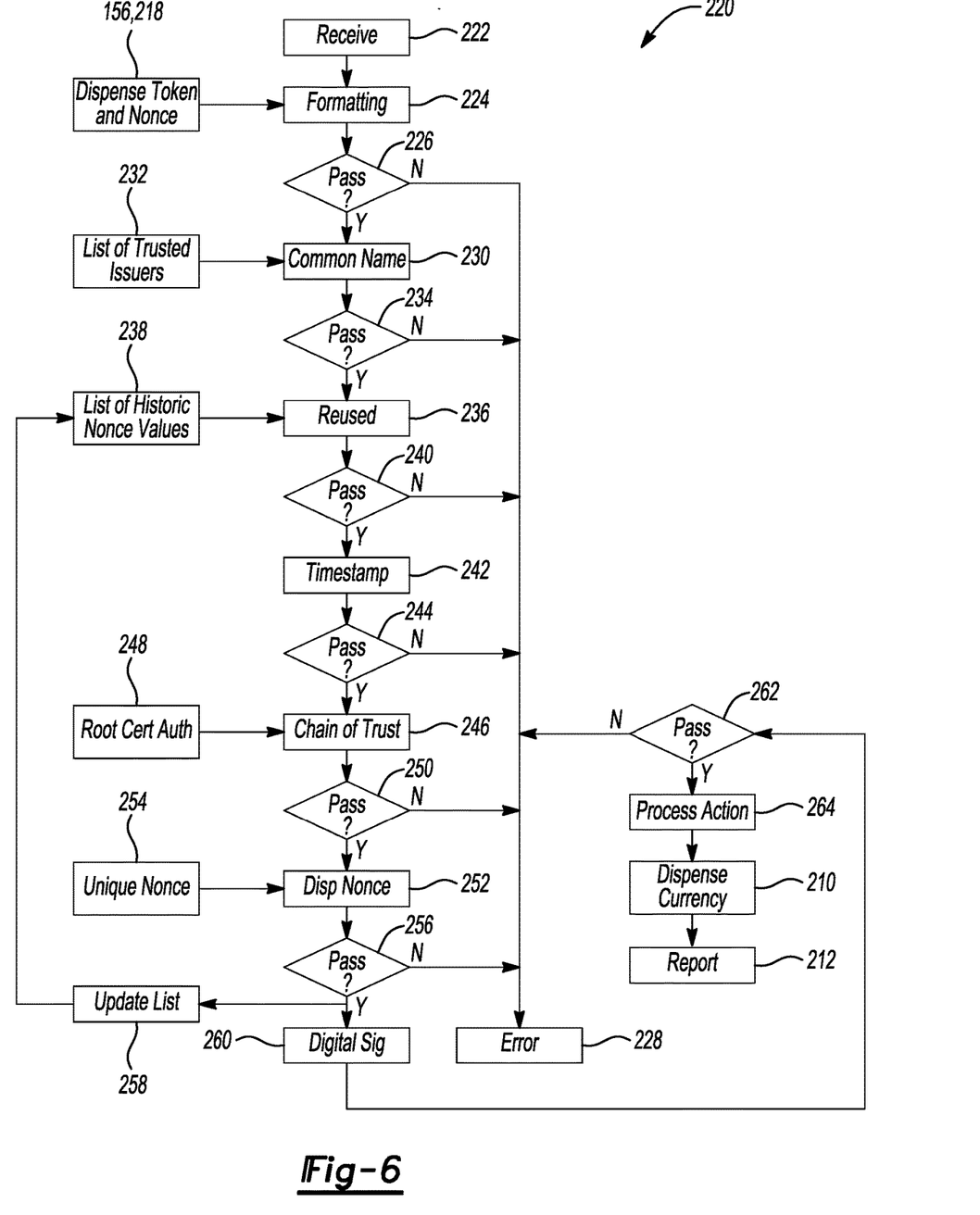
FIG. 6 is a flow diagram of a top level method of operation in accordance with one or more exemplary embodiments.

Referring to FIG. 6, a flow diagram of an example implementation of a top level method of operation 220 is shown in accordance with one or more exemplary embodiments. The method (or process) 220 may be performed by the cash dispenser unit 122. The method 220 generally includes a step 222, a step 224, a step 226, a step 228, a step 230, a step 232, a step 234, a step 236, a step 238, a step 240, a step 242, a step 244, a step 246, a step 248, a step 250, a step 252, a step 254, a step 256, a step 258, a step 260, a step 262, the step 210, and the step 212. Other steps and or step orders may be implemented or eliminated to meet the criteria of a particular application.

In the step 222, the cash dispenser unit 122 may receive a dispense operation from the controller 120. The dispense operation may include a secure dispense token 156 and a dispense nonce. The cash dispenser unit 122 verifies a formatting of the secure dispense token 156 in 218 by the step 224. At the step 226, if the verification fails, the cash dispenser unit 122 sends an error report to the controller 120 in the step 228 and the method 220 ends.

If the verification passes at the step 226, the cash dispenser unit 122 checks in the step 230 a common name of certificate in the secure dispense token 156 against a list of trusted issuers 232. If the verification fails at the step 234, the error report is generated in the step 228 and the method 220 ends.

If the verification passes in the step 234, the cash dispenser unit 122 verifies the dispense nonce 218 in the step 236 against a list of historical list 238 of nonce values that were previously generated and used in a transaction. If the verification fails per the step 240 (e.g., the dispense nonce 218 was found on the historical list 238), the error report is generated in the step 228 and the method 220 ends.

If the verification passes in the step 240, a timestamp of the secure dispense token 156 if checked in the step 242. For a secure dispense token 156 that has a timestamp within a predetermined time since the request token 214 was generated, the timestamp verification passes in the step 242. If the timestamp of the secure dispense token 156 is from beyond the predetermined time since the request token 214 was generated, the timestamp verification fails at the step 242. The error report is subsequently generated in the step 228, and the method 220 ends.

In the step 246, the cash dispenser unit 122 verifies a chain of trust for the signing certificate of the secure dispense token 156 against a root certificate authority 248. If the verification passes the check per the step 250, the method 220 continues by verifying the dispense nonce 218 in the step 252. If the verification fails at the step 250, the error report is generated in the step 228, and the method 220 ends.

In the step 252, the dispense nonce 218 is checked against a stored copy 254 of the unique nonce 216 generated in the step 188 (FIG. 5). For a proper withdrawal authorization, a value of the dispense nonce 218 matches a value of the unique nonce 216. If true at the step 256, the value of the just-used dispense nonce 218 is added to the historical list 238 of nonce values in the step 258. Furthermore, the digital signature in the secure dispense token 156 is checked in the step 260. If the value of the dispense nonce 218 is different from the value of the unique nonce 216, the check fails at the step 256. The error report is then generated in the step 228 and the method 220 ends.

In the step 260, the digital signature in the secure dispense token 156 is verified. If the digital signature is valid per the step 262, the method 220 continues with the step 264. If the digital signature is invalid per the step 262, the error report is generated in the step 228 and the method 220 ends.

After the digital signature is found valid, the cash dispenser unit 122 may process the action specified in the secure dispense token 156 in the step 264. In the step 210 (see FIG. 5), the currency 132 is presented from the cash dispenser unit 122 to the customer 88. Thereafter, the cash dispenser unit 122 reports completion of the authorized dispense action to the controller 120 in the step 212 (see FIG. 5).

Figure 7:
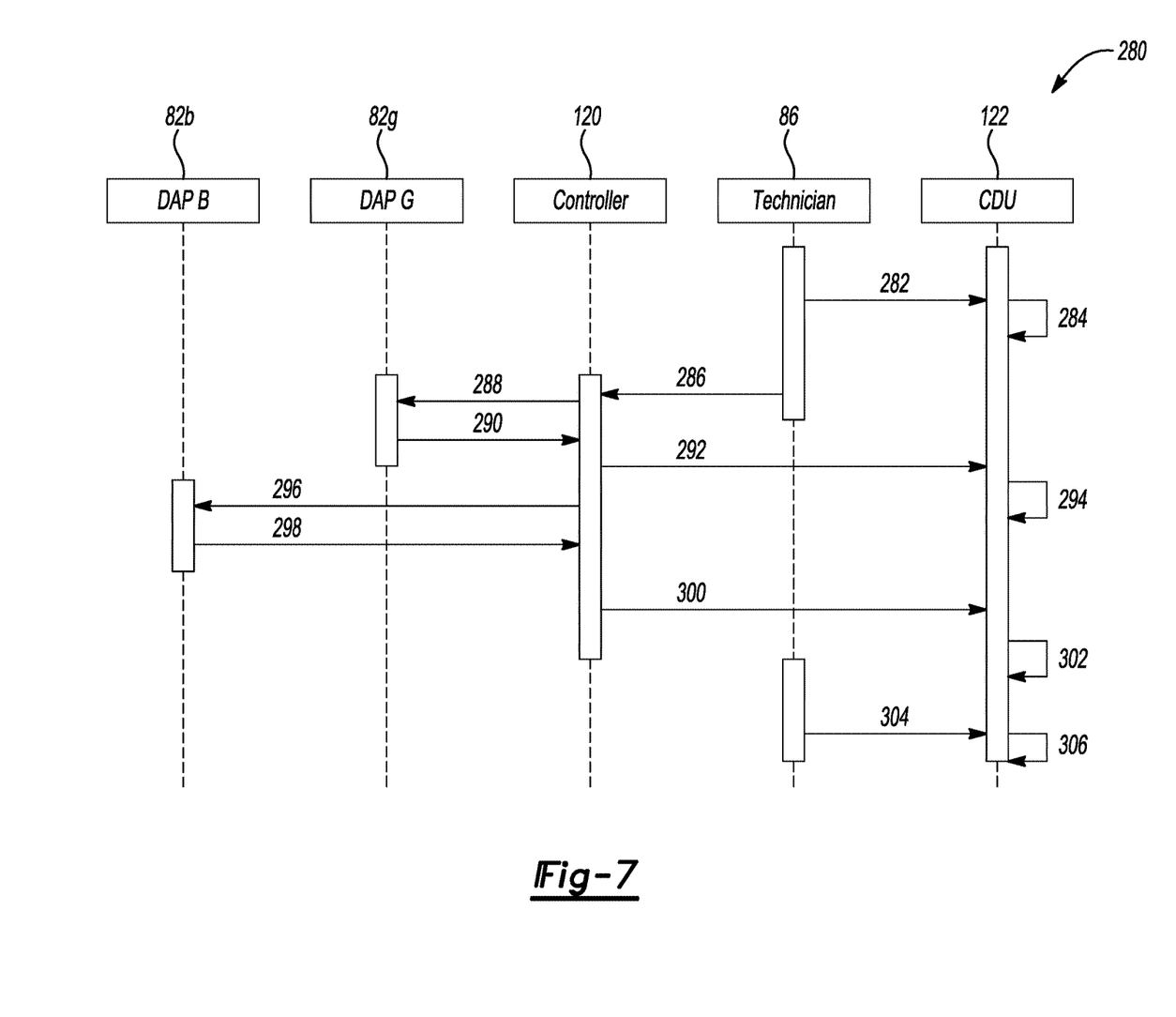
FIG. 7 is a schematic diagram of an activate operation in accordance with one or more exemplary embodiments.

Referring to FIG. 7, a schematic diagram of an example implementation of an activate operation 280 is shown in accordance with one or more exemplary embodiments. The operation (or method) 280 may be implemented by the system 80 (see FIG. 1). The operation 280 includes an action 282, an action 284, an action 286, an action 288, an action 290, an action 292, an action 294, an action 296, an action 298, an action 300, an action 302, an action 304, and an action 306. Other orders may be implemented to meet the criteria of a particular application.

The technician 86 may send 282 an enable enrollment command to the cash dispenser unit 122. The cash dispenser unit 122 may respond to the enable enrollment command by entering 284 the enrollment state. The technician 86 may also send 286 an activate host command to the controller 120. The activate host command may identify one or more particular dispense authorization parties 82a-82n (see FIG. 1).

The controller 120, in turn, sends 288 a get activate token message to a given one of the dispense authorization parties (e.g., 82g). The given dispense authorization party 82g responds by sending 290 an activate token back to the controller 120. The controller 120 relays 292 the activate token to the cash dispenser unit 122. The cash dispenser unit 122 binds 294 the given dispense authorization party 82g in response to the activate token.

Where multiple dispense authorization parties 82a-82n are being enrolled, the controller 120 sends 296 another get activate token to an additional (or second) one of the dispense authorization parties (e.g., 82b). The additional dispense authorization party 82b responds by sending 298 another activate token back to the controller 120. The controller 120 relays 300 the additional activate token to the cash dispenser unit 122. The cash dispenser unit 122 subsequently binds 302 the additional dispense authorization party 82*b*. The process of inviting the dispense authorization parties 82*a*-82*n* to bind with the cash dispenser unit 122 may be repeated multiple times until all intended dispense authorization parties 82*a*-82*n* have been bound to the cash dispenser unit 122. To end the enrollment state, the technician 86 may send 304 a disable enrollment command to the cash dispenser unit 122. The cash dispenser unit 122 responds to the disable enrollment command by transitioning 306 into the active state.

Figure 8:
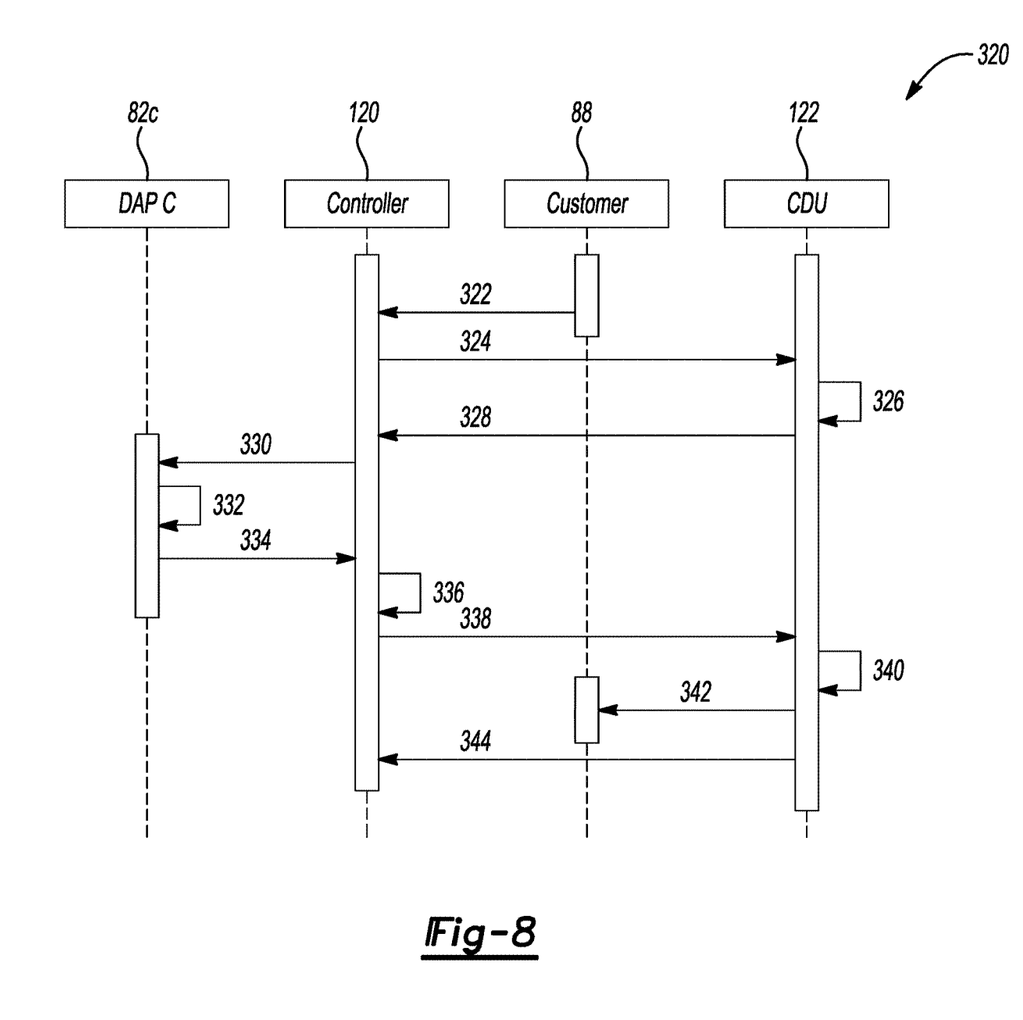
FIG. 8 is a schematic diagram of a dispense operation in accordance with one or more exemplary embodiments

Referring to FIG. 8, a schematic diagram of an example implementation of a dispense operation 320 is shown in accordance with one or more exemplary embodiments. The operation (or method) 320 may be implemented by the system 80. The operation 320 includes an action 322, an action 324, an action 326, an action 328, an action 330, an action 332, an action 334, an action 336, an action 338, an action 340, an action 342, and an action 344. Other orders may be implemented to meet the criteria of a particular application.

The customer 88 may provide 322 a manual entry to the controller 120 to withdraw cash. The controller 120 sends 324 the transaction request to the cash dispenser unit 122 based on the manual entry. The cash dispenser unit 122 authorizes 326 the requested transaction by generating a request token and a unique nonce. The request token and the unique nonce are transferred 328 back to the controller 120. The controller 120 communicates 330 the request token and the unique nonce to a corresponding dispense authorization party (e.g., 82*c*).

The corresponding dispense authorization party 82*c* authorizes 332 the withdraw request in response to the request token and the unique nonce. If the withdrawal request is valid, the corresponding dispense authorization party 82*c* generates a secure dispense token and a dispense nonce that are subsequently communicated 334 back to the controller 120.

The controller 120 may validate 336 the secure dispense token. If the secure dispense token is valid, the controller 120 sends 338 the secure dispense token and the secure nonce to the cash dispenser unit 122. The cash dispenser unit 122 will validate 340 the secure dispense token and the secure nonce. If both the secure dispense token and the secure nonce are valid, the cash dispenser unit 122 dispenses 342 the requested currency 132 to the customer 88. Thereafter, the cash dispenser unit 122 may report 344 a completion of the withdrawal request to the controller 120.

Figure 9:
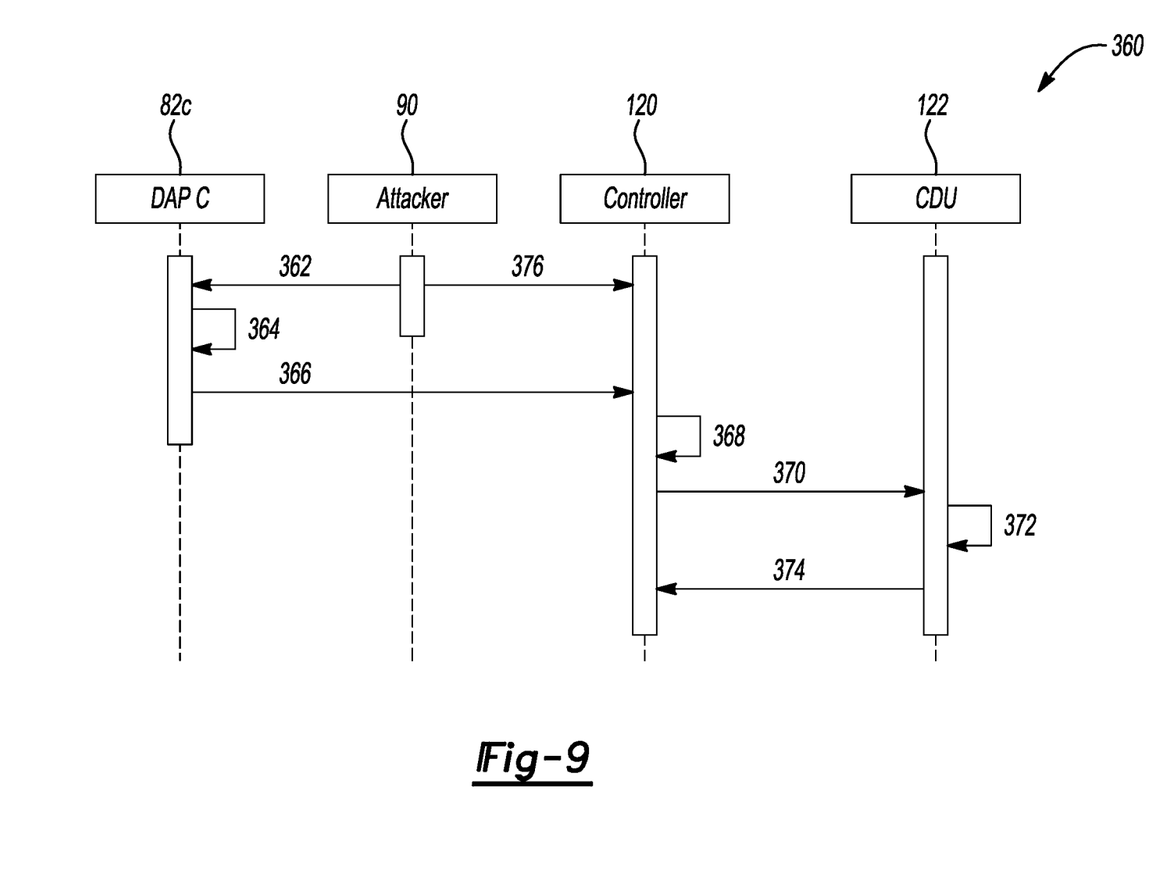
FIG. 9 is a schematic diagram of an attack operation in accordance with one or more exemplary embodiments.

Referring to FIG. 9, a schematic diagram of an example implementation of an attack operation 360 is shown in accordance with one or more exemplary embodiments. The operation (or method) 360 may be implemented by the system 80. The operation 360 includes an action 362, an action 364, an action 366, an action 368, an action 370, an action 372, an action 374, and an action 376. Other orders may be implemented to meet the criteria of a particular application.

An attacker 90 may send 362 to a dispense authorization party (e.g., 82*c*) what appears to the dispense authorization party 82*c* to be a valid withdrawal request. The dispense authorization party 82*c* validates 364 the request and communicates 366 an apparently valid withdrawal approval to the controller 120. The controller 120 may validate 336 the withdrawal approval and subsequently inform the cash dispenser unit 122 to dispense the approved amount of cash. Upon further validation 372 of the secure disperse token, the disperse nonce, the timestamp, the chain of trust, and the digital signature, the cash dispenser unit 122 may conclude that one or more parameters of the withdrawal authorization is invalid. Therefore, the cash dispenser unit 122 may send 374 an error message to the controller 120 without dispensing the requested currency 132.

Another example involves the attacker 90 injecting 376 malicious software into the controller 120 that, ordinarily, would invoke a cash dispense operation. The injection 376 may be performed electronically or by a hardware attack (e.g., replacing a hard drive in the controller 120). With the protocol implemented in the cash dispenser unit 122, the digital signature information authorizing the dispense would be missing or corrupt, the timestamp would be incorrect, the dispense nonce would be incorrect and/or the dispense nonce would be a reused value. Therefore, the cash dispenser unit 122 would fail the validation 372, send 374 the error message, and subsequently refusal to perform the dispense operation.

Various embodiments of the automatic teller machine 100 generally ensure that cash dispensing operations are robust against line attacks, replay attacks, malicious software injection, hard drive swaps, and other attempts to circumvent a standard transaction flow. The cash dispenser unit 122 within the secure compartment 104 of the automatic teller machine 100 forms a trust with the enrolled dispense authorization parties 82*a*-82*n*. A secure dispense token is formatted to represent data structures utilized in the secure dispense protocol making attacks more difficult. The secure dispense tokens are encoded using the JSON Web Signature structure, enabling the token to be verified by various digital signature verification techniques.

While the best modes for carrying out the disclosure have been described in detail, those familiar with the art to which this disclosure relates will recognize various alternative designs and embodiments for practicing the disclosure within the scope of the appended claims.

What is claimed is:

1. An automatic teller machine comprising:
  a computer in electronic communication with a plurality of dispense authorization parties that are remote from the automatic teller machine, and the computer is configured to:
  receive an activate token from a given dispense authorization party of the plurality of dispense authorization parties;
  generate a requested transaction in response to a manual entry of a requested cash value;
  send a withdrawal request to the given dispense authorization party, wherein the withdrawal request includes a unique nonce;
  receive a withdrawal authorization from the given dispense authorization party, wherein the withdrawal authorization includes a secure dispense token, a dispense nonce and an authorized cash value; and
  receive a deactivation token from the given dispense authorization party; and
  a dispenser in electronic communication with the computer, and the dispenser is configured to:
  transition from an inactive state to an enrollment state in response to an enrollment command;
  accept the activate token from the computer while in the enrollment state and reject the activate token while in the inactive state;
  allocate a given trust of a plurality of trusts to the given dispense authorization party in response to the acceptance of the activate token;

transition from the enrollment state to an active state in response to the allocation of the given trust;
generate the unique nonce in response to the requested transaction;
receive the withdrawal authorization from the computer;
verify that the secure dispense token and the dispense nonce in the withdraw authorization are valid based on both the given trust and by verifying that the secure dispense token includes a name of the given dispense authorization party on a list of trusted token issuer;
dispense a currency matching the requested authorized cash value in response to the secure dispense token and the dispense nonce being valid;
receive the deactivation token from the computer while in the active state; and
unbind the given dispense authorization party from the dispenser in response to the reception of the deactivation token.

2. The automatic teller machine according to claim 1, wherein the dispenser is configured to reject the withdrawal authorization in response to finding invalid one or more of the secure dispense token and the dispense nonce.

3. The automatic teller machine according to claim 1, wherein the dispenser verifies that the secure dispense token and the dispense nonce are valid by further verifying that the dispense nonce has been received a single time based on a list of historic nonce values that were previously utilized.

4. The automatic teller machine according to claim 1, wherein the dispenser verifies that the secure dispense token and the dispense nonce are valid by further verifying that a dispense timestamp of the secure dispense token is within a predetermined time after the requested transaction is received.

5. The automatic teller machine according to claim 1, wherein the dispenser verifies that the secure dispense token and the dispense nonce are valid by further verifying a chain of trust for a signing certificate of the secure dispense token is valid.

6. The automatic teller machine according to claim 1, wherein the dispenser verifies that the secure dispense token and the dispense nonce are valid by further verifying that the dispense nonce matches the unique nonce.

7. The automatic teller machine according to claim 1, wherein the dispenser verifies that the secure dispense token and the dispense nonce are valid by further verifying a digital signature of the secure dispense token is valid and properly created by information of the given dispense authorization party.

8. The automatic teller machine according to claim 1, further comprising:
an electronics compartment that houses the computer;
a secure compartment that houses the dispenser and is physically inaccessible from the electronics compartment; and
a door attached to the secure compartment and configured to provide lockable access to the dispenser.

9. A method for secure operations in an automatic teller machine, the method comprising:
transitioning a dispenser from an inactive state to an enrollment state in response to an enrollment command;
receiving, at a computer, an activate token from a given dispense authorization party of a plurality of dispense authorization parties, wherein the plurality of dispense authorization parties is remote from the automatic teller machine;
accepting, in the dispenser, the activate token while in the enrollment state and rejecting the activate token while in the inactive state;
allocating, in the dispenser, a given trust of a plurality of trusts to the given dispense authorization party in response to the acceptance of the activate token;
transitioning the dispenser from the enrollment state to an active state in response to the allocation of the given trust;
generating, in the computer, a requested transaction in response to a manual entry of a requested cash value;
generating, in the dispenser, a unique nonce in response to the requested transaction;
sending a withdrawal request from the computer to the given dispense authorization party, wherein the withdrawal request includes the unique nonce;
receiving, at the computer from the given dispense authorization party, a withdrawal authorization, wherein the withdrawal authorization includes a secure dispense token, a dispense nonce and an authorized cash value;
verifying, in the dispenser, that the secure dispense token and the dispense nonce in the withdraw authorization are valid based on both the given trust and that the secure dispense token includes a name of the given dispense authorization party on a list of trusted token issuers;
dispensing, from the dispenser, a currency that matches the authorized cash value in response to the secure dispense token and the dispense nonce being valid;
receiving, at the computer, a deactivation token from the given dispense authorization party;
receiving, at the dispenser, the deactivation token from the computer while in the active state; and
unbinding the given dispense authorization party from the dispenser in response to the receiving of the deactivation token.

10. The method according to claim 9, wherein the verifying that the secure dispense token and the dispense nonce are valid further includes:
verifying that the dispense nonce has been received a single time based on a list of historic nonce values that were previously verified.

11. The method according to claim 9, wherein the verifying that the secure dispense token and the dispense nonce are valid further includes:
verifying that a dispense timestamp of the secure dispense token is within a predetermined time after the requested transaction is received by the dispenser.

12. The method according to claim 9, wherein the verifying that the secure dispense token and the dispense nonce are valid further includes:
verifying a chain of trust for a signing certificate of the secure dispense token is valid.

13. The method according to claim 9, wherein the verifying that the secure dispense token and the dispense nonce are valid further includes:
verifying that the dispense nonce matches the unique nonce.

14. The method according to claim 9, wherein the verifying that the secure dispense token and the dispense nonce are valid further includes:
verifying a digital signature of the secure dispense token is valid and properly created by information of the given dispense authorization party.

15. The method according to claim 9, further comprising:
rejecting the withdrawal authorization in the dispenser in response to finding invalid one or more of the secure dispense token and the dispense nonce.

16. An automatic teller machine comprising:
a computer in electronic communication with a plurality of dispense authorization parties that are remote from the automatic teller machine, and the computer is configured to:
receive an activate token from a given dispense authorization party of the plurality of dispense authorization parties;
generate a requested transaction in response to a manual entry of a requested cash value;
send a withdrawal request to the given dispense authorization party of the plurality of dispense authorization parties, wherein the withdrawal request includes a unique nonce;
receive a withdrawal authorization from the given dispense authorization party, wherein the withdrawal authorization includes a secure dispense token, a dispense nonce and an authorized cash value;
receive a deactivation token from the given dispense authorization party; and
a dispenser in electronic communication with the computer, and the dispenser is configured to:
transition from an inactive state to an enrollment state in response to reception of an enrollment command;
accept the activate token from the computer while in the enrollment state and reject the activate token while in the inactive state;
allocate a given trust of a plurality of trusts to the given dispense authorization party in response to the acceptance of the activate token;
transition from the enrollment state to an active state in response to the allocation of the given trust;
generate the unique nonce in response to the requested transaction;
receive the withdrawal authorization from the computer;
verify that the secure dispense token and the dispense nonce are valid based on both the given trust and that a dispense timestamp of the secure dispense token is within a predetermined time after the requested transaction is received; and
dispense a currency matching the authorized cash value in response to the secure dispense token and the dispense nonce being valid;
receive the deactivation token from the computer while in the active state; and
unbind the given dispense authorization party from the dispenser in response to the reception of the deactivation token.

17. The automatic teller machine according to claim 16, wherein the dispenser verifies that the secure dispense token and the dispense nonce are valid by further verifying that the dispense nonce has been received a single time based on a list of historic nonce values that were previously utilized.

18. The automatic teller machine according to claim 16, wherein the dispenser verifies that the secure dispense token and the dispense nonce are valid by further verifying a chain of trust for a signing certificate of the secure dispense token is valid.

19. The automatic teller machine according to claim 16, wherein the dispenser verifies that the secure dispense token and the dispense nonce are valid by further verifying a digital signature of the secure dispense token is valid and properly created by information of the given dispense authorization party.

20. The automatic teller machine according to claim 16 further comprising:
an electronics compartment that houses the computer;
a secure compartment that houses the dispenser and is physically inaccessible from the electronics compartment; and
a door attached to the secure compartment and configured to provide lockable access to the dispenser.

* * * * *